United States Patent [19]
Brennan

[11] Patent Number: 5,938,768
[45] Date of Patent: Aug. 17, 1999

[54] FEATURE TO FACILITATE NUMERIC PASSCODE ENTRY

[75] Inventor: Paul Michael Brennan, East York, Canada

[73] Assignee: Northern Telecom Limited, Montreal, Canada

[21] Appl. No.: 08/903,376

[22] Filed: Jul. 30, 1997

[51] Int. Cl.[6] .................................................. G06F 11/00
[52] U.S. Cl. .................................................. 713/202
[58] Field of Search ........................... 395/186, 187.01, 395/188.01, 200.59; 380/3, 23, 25; 340/825.31, 825.34

[56] References Cited

U.S. PATENT DOCUMENTS

| | | | |
|---|---|---|---|
| 3,938,091 | 2/1976 | Atalla et al. ....................... | 340/825.31 |
| 4,283,599 | 8/1981 | Atalla ................................ | 380/24 |
| 5,682,475 | 10/1997 | Johnson et al. .................... | 395/188.01 |
| 5,793,952 | 8/1998 | Limsico ............................. | 395/188.01 |
| 5,797,128 | 8/1998 | Birnbaum .......................... | 395/186 |

*Primary Examiner*—Robert W. Beausoliel, Jr.
*Assistant Examiner*—Pierre E. Elisca

[57] ABSTRACT

Information systems which provide access over a variety of devices (e.g. telephones, automated banking machines, computers) typically require that passcodes be numeric to allow entry on all device types. Alphabetic characters are associated with the numeric digits on both telephones and automated banking machines, allowing users to use mnemonic words to remember their numeric passcodes. Computer terminals do not have this association, creating user difficulties. The invention translates text entry on a computer keyboard into the equivalent numeric digits according to an appropriate mapping.

13 Claims, 4 Drawing Sheets

| MAPPING TABLE INPUT VALUE | MAPPING NO. 1 | MAPPING NO. 2 | MAPPING NO. 3 |
|---|---|---|---|
| a, A, b, B, c, or C | 2 | 2 | 2 |
| d, D, e, E, f, or F | 3 | 3 | 3 |
| g, G, h, H, i, or I | 4 | 4 | 4 |
| j, J, k, K, l, or L | 5 | 5 | 5 |
| m, M, n, N, o, or O | 6 | 6 | 6 |
| p, P, r, R, s, or S | 7 | 7 | 7 |
| t, T, u, U, v, or V | 8 | 8 | 8 |
| w, W, x, X, y, or Y | 9 | 9 | 9 |
| q or Q | 1 | 0 | 7 |
| z or Z | 1 | 0 | 9 |
| 1 | 1 | 1 | 1 |
| 2 | 2 | 2 | 2 |
| 3 | 3 | 3 | 3 |
| 4 | 4 | 4 | 4 |
| 5 | 5 | 5 | 5 |
| 6 | 6 | 6 | 6 |
| 7 | 7 | 7 | 7 |
| 8 | 8 | 8 | 8 |
| 9 | 9 | 9 | 9 |
| 0 | 0 | 0 | 0 |

FIG. 3

FEATURE TO FACILITATE NUMERIC PASSCODE ENTRY

FIELD OF THE INVENTION

This invention relates to a method and apparatus for handling a passcode for a numeric passcode controlled device.

BACKGROUND OF THE INVENTION

Automatic systems which provide information to users have become very common. For years, many systems have allowed users to access information from a telephone and its keypad or from a banking machine and more recently, with the growth of home computers, modems, and the internet, from a computer and its keyboard as well. In many cases, these systems require that the user identify themselves with some passcode or access code.

Typical examples of such systems are: voice messaging systems—which allow a user to retrieve the messages that others have left them—and automated banking or account information systems—which allow a user to retrieve information about their personal accounts and perhaps to make payments from or transfers between those accounts.

NORSTAR VOICE MESSAGING™ version 3, MERIDIAN MAILS™ and VISIT MESSENGER™, all manufactured by Northern Telecom Limited, are voice messaging systems which allow the user to retrieve their messages from either a telephone or a computer connected via network or modem. MERIDIAN IVR™, also manufactured by Northern Telecom Limited, is an interactive voice response system which allows third parties to customize systems for information retrieval. In many cases such a system is used to integrate with banking or other systems and build the aforementioned information retrieval systems, allowing a customer of a bank to access information from a telephone, a banking machine, or a computer.

As these systems provide access to confidential information, they require that the user identify and authenticate themselves. The identification is typically an account number, with authentication by way of a confidential passcode. As users may access the system at any time from either the telephone or computer, the passcode must be numeric in nature.

Recognising that many users have difficulty in remembering these numeric passcodes (of which they may have a multiplicity for different services, machines, and environments), the keypads of telephones and banking machines provide standard mappings of letters to numbers. This allows users to make use of a mnemonic aid, that is, to select an easily remembered word which utilises the letters to which the numbers of the passcode map.

The user can then simply "type" their mnemonic word by pressing the corresponding numeric keys. A problem occurs, however, when the user must enter their passcode on a computer. Existing systems require that the user enter the number on their computer. And unfortunately, computer numeric keys do not have the associated alphabetic lettering on them.

This problem is typically solved by users referring to a telephone to determine which numeric key each letter of their mnemonic word maps to, and then entering these numeric keys on their computer. This is awkward for the user, and where no telephone is proximate to the computer, may result in the attempt being abandoned until the user can find a phone and write down the appropriate number. It is also potentially confusing for the user since the layout of the numeric keys on the telephone differs from that on computer keyboards, that is, some computer keyboards have only a row of numbers, and those that have a numeric keypad as well have it in a different layout from that on a telephone.

Where a user resorts to writing down the numeric equivalent of the mnemonic word to prevent future trouble, the security and confidentiality of the passcode, and therefore the information which is protected by the passcode, is reduced.

It should be noted that a similar problem occurs when a user is creating a new passcode while using the computer. Without the ability to conveniently enter a mnemonic word, the user generally resorts to a numeric passcode, which in most cases is written down, again compromising the security and confidentiality of the protected information.

SUMMARY OF THE INVENTION

This invention relates generally to systems or devices which provide users the ability to access information via a telephone and its keypad and/or via a banking machine and its keypad and via a computer and its keyboard, and which require users to enter passcodes to authenticate themselves. An object of the present invention is to allow a user to enter their mnemonic word directly on a computer terminal.

According to the present invention, there is provided a method for handling a passcode for a numeric passcode controlled device, comprising the steps of: receiving an alphabetic passcode; mapping each letter of said alphabetic passcode to a number based on a pre-defined mapping to obtain a mapped passcode; and utilising said mapped passcode to attempt access of said numeric passcode controlled device.

According to another aspect of the invention, there is provided apparatus for accessing a numeric passcode controlled device, comprising: entry means to enter an alphabetic passcode; processing means to map each letter of said alphabetic passcode to a number; and means to utilize said mapped passcode to attempt access of said numeric passcode controlled device.

BRIEF DESCRIPTION OF THE DRAWINGS

In the drawings which illustrate example embodiments of the invention:

FIG. 3 is a mapping table stored in memory of a system operating under the software control of FIG. 2.

DETAILED DESCRIPTION OF THE PREFERRED EMBODIMENTS

Figure 1:
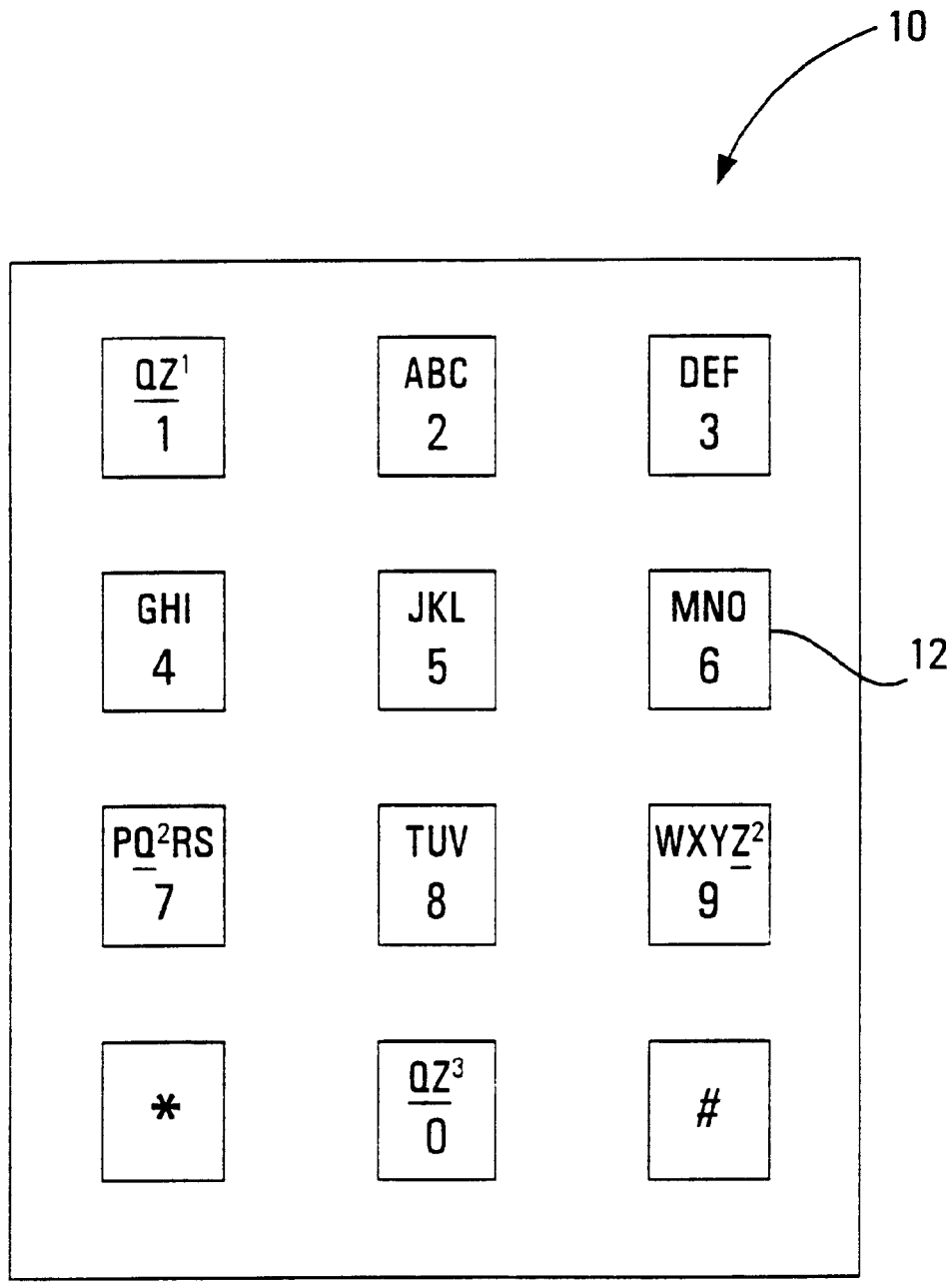
FIG. 1 illustrates a keypad of an exemplary banking machine or telephone.

Turning to FIG. 1, a keypad 10 for a banking machine or telephone has ten digit keys 12 as well as keys marked with a "*" and a "#". The digit keys have letters associated with them, with the standard association being "ABC" associated with the digit key marked 2, "DEF" with 3, "GHI" with 4, "JKL" with 5, "MNO" with 6, "PRS" with 7, "TUV" with 8, and "WXY" with 9. The "Q" and "Z", however, appear in one of several places, as follows:

1 The vast majority of banking machines, and a significant number of existing telephones, associate the "Q" and "Z" with the 1 key.

2 International standards for telephones now associate the "Q" and "Z" with the 7 and 9 respectively, and many new telephones have this association.

3 A significant number of existing telephones associate the "Q" and "Z" with the 0 key.

This letter association encourages a user to utilize a more easily remembered alphabetic passcode (i.e., a passcode composed wholly of letters or a passcode which is an alphanumeric which includes at least one letter) where a passcode is required to enter a system accessible by the keypad. A system embodying the subject invention allows a user to access the same system through a computer keyboard or other alphabet based entry device without difficulty.

In overview, a system embodying the subject invention may be programmed such that whenever access is attempted through a text based input device such as a keyboard, the user is prompted to enter their numeric passcode either numerically or utilising an alphabetic mnemonic. The user may type the mnemonic passcode directly on the alphabetic section of the keyboard (e.g. "S E C R E T"). The system translates the entered letters into the corresponding digits (e.g. 7 3 2 7 3 8) in accordance with whichever mapping is determined by the system as appropriate (the mapping only differs with the letters "Q" and "Z"). The resulting numeric passcode is then passed on to the authenticating system on behalf of the user.

Users who happen to remember the numeric equivalent, or who indeed use an easily remembered number are not impacted in any way; they enter numeric digits which are passed through without translation. The foregoing operation is also descriptive of the process used when a new passcode is entered into the system, allowing the use of a mnemonic word.

Figure 2:
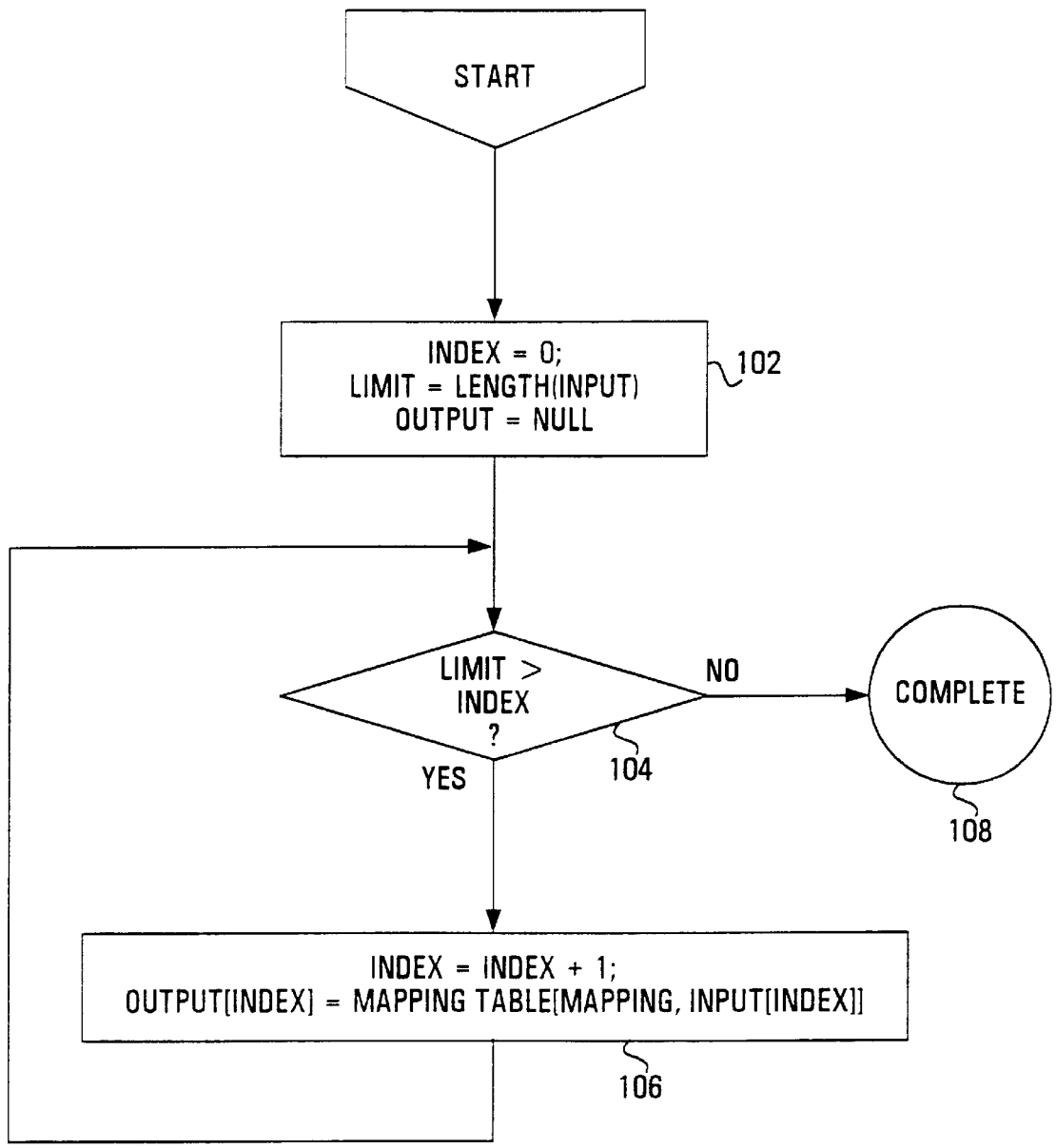
FIGS. 2 is a software block diagram of the software control for a system operating in accordance with this invention.

FIG. 2 shows the program control for a system embodying this invention. It is assumed the user accesses the system through a keyboard. Turning to FIG. 2, the system initialises an "Index" variable to 0, a "Limit" variable to the length of the "Input" string, and an "Output" string to a null set (box 102). If the length of an Input string is greater than zero (box 104), then the Index variable is incremented to one and the first number of the Output string is determined from the mapping table illustrated in FIG. 3 using, as table pointers, the value (i.e., the identity) of the first character of the Input and the appropriate mapping for lower and upper case "q" and "z" (box 106). The system may determine which mapping is appropriate for the small and upper case letters "q" and "z" based on the identity of the user, which identity is normally input to the system by a user prior to inputting their passcode. In this regard, it is noted that Mapping No. 1 maps the "q" and "z" to the number 1, Mapping No. 2 maps these letters to the number 0 and Mapping No. 3 maps the "q" to 7 and the "z" to 9. After the first number of the Output is determined, the process is repeated from box 104 to determine the next number of the Output string, and so on. Once the last character of the Input string has been mapped, the Index variable will have been incremented to the value of the Limit variable so that processing will be complete when box 104 is next encountered (boxes 104, 108) and the Output string may be utilised as the passcode.

Figure 4:
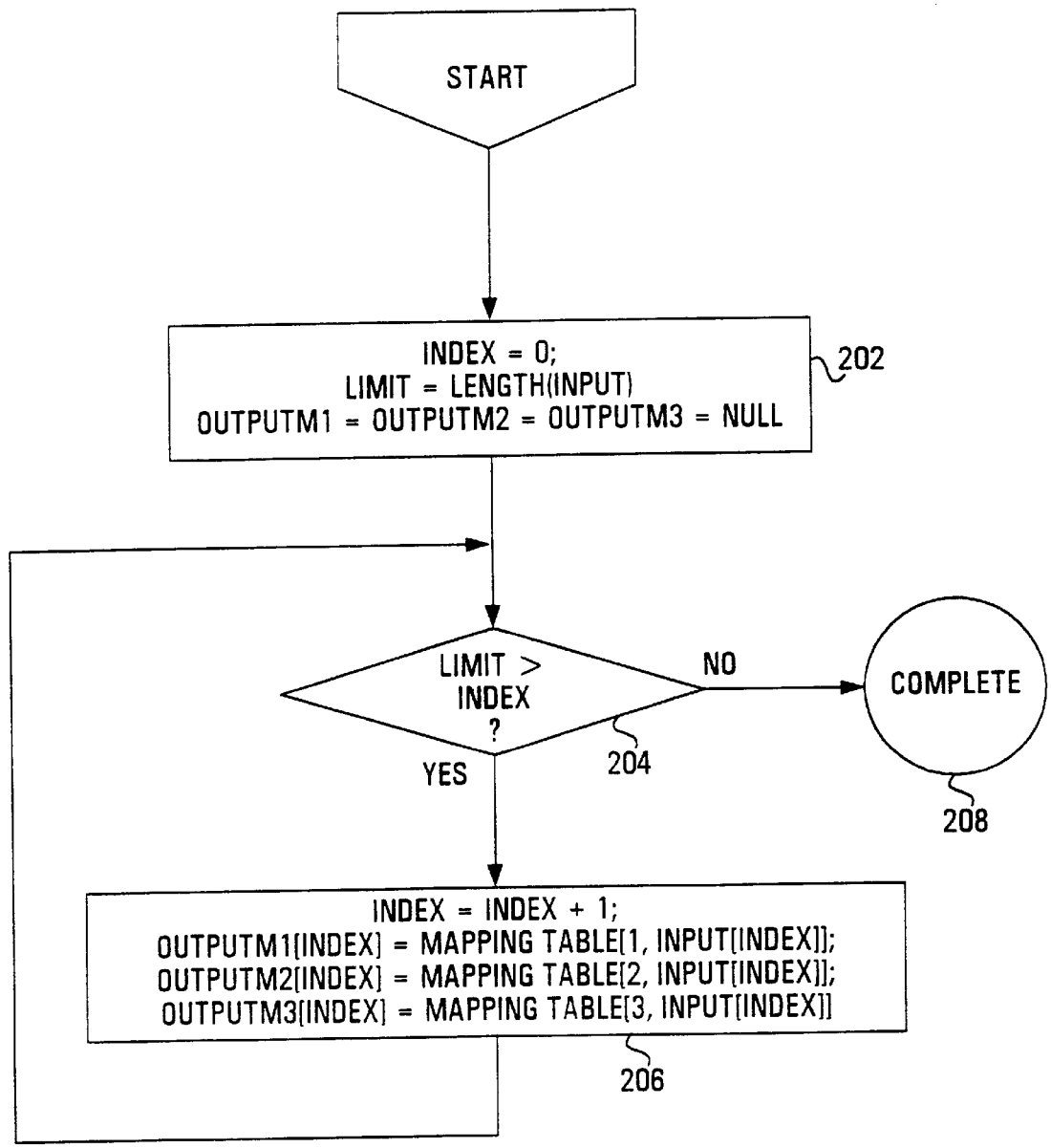
FIG. 4 is a software block diagram of the software control for a system operating in accordance with another aspect of this invention.

FIG. 4 shows the program control for another system embodying the subject invention. The system under the program control of FIG. 4 returns multiple passcodes when an upper or lower case "q" or "z" is included in the user's input. Turning to FIG. 4, again an Index variable is initially set to zero, a Limit variable is set to the length of the Input string, and three Output strings, OutputM1, OutputM2, and OutputM3, are each set to a null set (box 202). If the Limit variable is larger than the current value of the Index variable (box 204), then the Index variable is incremented to one, and, utilising the mapping table of FIG. 3, the first character of the Input is mapped in accordance with Mapping No. 1 to obtain the first number of the output string OutputM1, the first character of the Input is mapped in accordance with Mapping No. 2 to obtain the first number of the output string OutputM2, and the first character of the Input is mapped in accordance with Mapping No. 3 to obtain the first number of the output string OutputM3 (box 206). The process is then repeated from box 204 to determine the next number for each of the Output strings. Once the last character of the Input string has been mapped, the Index variable will have been incremented to the value of the Limit variable so that processing will be complete when box 204 is next encountered (boxes 204, 208) and the three Output strings may be consecutively utilised as the passcode.

Thus, the embodiment of FIG. 4 provides multiple numeric passcodes in response to character entries which are ambiguous due to the differences in character mappings; for example, if a user were to enter "J A Z Z", the translation mechanism would provide three alternate passcodes for authentication, 5 2 9 9; 5 2 1 1; and 5200. This facilitates user access when the mapping basis for the mnemonic is unknown. The authentication software can then attempt to validate both resulting passcodes, and allow user access if one is correct; it is noted that this would minimally reduce security of the system.

Figure 5:
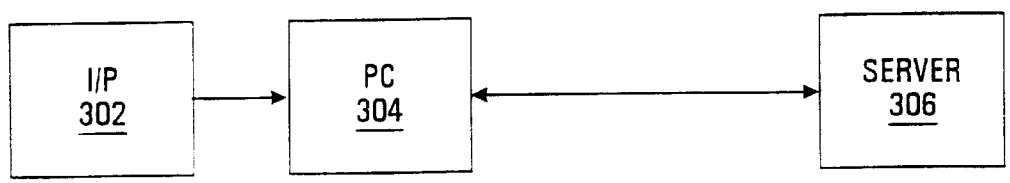
FIG. 5 is a block diagram of a system which may embody the subject invention.

Systems utilising this invention may have many different architectures; the described embodiments of the invention assume a client/server architecture depicted in FIG. 5 in which user input from an input device 302 (such as a keyboard or voice input device) is collected at a user PC 304, and transmitted, unprocessed, to the server 306 for validation by a passcode control program. Further assumed is that the client disallows any attempted user's entry of invalid characters (e.g. non-numeric and nonalphabetic) and appropriately signals the user in such an event.

This invention is applicable to any system or device which accepts user input of a numeric passcode which may be remembered by the user as a textual or alphanumeric string.

While the embodiments described utilize the most common three mappings from letters to numbers, a system of this invention could readily be adapted to accommodate other mappings.

The advantages of this mechanism are as follows: users frustration is eliminated; user and computer time wasted in manual translation is eliminated; passcode security is not compromised unnecessarily. In summary, this invention facilitates numeric passcode entry, to the advantage of both user and system.

Modifications will be apparent to those skilled in the art and, therefore, the invention is defined in the claims.

What is claimed is:

1. A method for handling a passcode for a numeric passcode controlled device comprising the steps of:
    receiving an alphabetic passcode;
    mapping each letter of said alphabetic passcode to a number based on a pre-defined mapping to obtain a mapped passcode, wherein said mapping step comprises mapping each upper and lower case letter a, b, and c of said alphabetic passcode to the number two; and utilizing said mapped passcode to attempt access of said numeric passcode controlled device.

2. The method of claim 1 wherein said mapping step comprises mapping each upper and lower case letter d, e, and f of said alphabetic passcode to the number three.

3. The method of claim 2 wherein said mapping step comprises mapping each upper and lower case letter g, h, and i of said alphabetic passcode to the number four.

4. The method of claim 3 wherein said mapping step comprises mapping each upper and lower case letter j, k, and l of said alphabetic passcode to the number five.

5. The method of claim 4 wherein said mapping step comprises mapping each upper and lower case letter m, n, and o of said alphabetic passcode to the number six.

6. The method of claim 5 wherein said mapping step comprises mapping each upper and lower case letter p, r, and s of said alphabetic passcode to the number seven.

7. The method of claim 6 wherein said mapping step comprises mapping each upper and lower case letter t, u, and v of said alphabetic passcode to the number eight.

8. The method of claim 7 wherein said mapping step comprises mapping each upper and lower case letter w, x, and y of said alphabetic passcode to the number nine.

9. The method of claim 8 wherein said mapping step comprises mapping each upper and lower case letter q and z of said alphabetic passcode to the number one.

10. The method of claim 8 wherein and lowering step comprises mapping each upper and lower case letter q and z of said alphabetic passcode to the number zero.

11. The method of claim 8 wherein said mapping step comprises mapping each upper and lower case letter q of said alphabetic passcode to the number seven and each upper and lower case letter z of said alphabetic passcode to the number nine.

12. A method for handling a passcode for a numeric passcode controlled device, comprising the steps of:

receiving an alphabetic passcode;

mapping each letter of said alphabetic passcode to a number based on a first pre-defined mapping to obtain a first mapped passcode:

mapping each letter of said alphabetic passcode to a number based on a second pre-defined mapping to obtain a second mapped passcode;

mapping each letter of said alphanumeric passcode to a number based on a third pre-defined mapping to obtain a third mapped passcode; and utilizing said first mapped passcode along with said second mapped passcode and said third mapped passcode to attempt access of said numeric passcode controlled device;

wherein, apart from lower and upper case letters q and z, for any given letter, said first mapping step, said second mapping step, and said third mapping step map said given letter to the same number.

13. The method of claim 12 wherein said first mapping step comprises mapping each upper and lower case letter q and z of said alphabetic passcode to the number zero, said second mapping step comprises mapping each upper and lower case letter q and z of said alphabetic passcode to the number one, and said third mapping step comprises mapping each upper and lower case letter q of said alphabetic passcode to the number seven and each upper and lower case letter z of said alphabetic passcode to the number nine.

* * * * *

UNITED STATES PATENT AND TRADEMARK OFFICE
CERTIFICATE OF CORRECTION

PATENT NO. : 5,938,768
DATED : August 17, 1999
INVENTOR(S) : Paul Michael Brennan It is certified that error appears in the above-identified patent and that said Letters Patent is hereby corrected as shown below:

In claim 10, replace "and lowering step comprises mapping each upper and lower case letter q and z of said alphabetic passcode to the number zero" with --said mapping step comprises mapping each upper and lower case letter q and z of said alphabetic passcode to the number zero.--

Signed and Sealed this

Seventh Day of March, 2000

Attest:

Q. TODD DICKINSON

Attesting Officer

Commissioner of Patents and Trademarks